(12) United States Patent
Brown

(10) Patent No.: US 6,171,651 B1
(45) Date of Patent: Jan. 9, 2001

(54) PRODUCTION OF ALUMINIUM HYDROXIDE COATED GLASS MICROSPHERES

(75) Inventor: Neil Brown, Bergheim (DE)

(73) Assignee: Martinswerk GmbH fur Chemische und Metallurgische Produktion, Bergheim (DE)

( * ) Notice: Under 35 U.S.C. 154(b), the term of this patent shall be extended for 0 days.

(21) Appl. No.: 09/341,995

(22) PCT Filed: Jan. 28, 1998

(86) PCT No.: PCT/EP98/00452

§ 371 Date: Jul. 22, 1999

§ 102(e) Date: Jul. 22, 1999

(87) PCT Pub. No.: WO98/33748

PCT Pub. Date: Aug. 6, 1998

(30) Foreign Application Priority Data

Jan. 30, 1997 (GB) .................................................. 9702171

(51) Int. Cl.⁷ ...................................................... B05D 7/00
(52) U.S. Cl. ........................... 427/216; 427/212; 427/226; 427/376.1; 427/397.7
(58) Field of Search ..................................... 427/212, 215, 427/226, 376.1, 397.7; 428/403

(56) References Cited

U.S. PATENT DOCUMENTS

| | | | |
|---|---|---|---|
| 4,624,798 | * 11/1986 | Gindrup et al. | 428/403 |
| 4,632,951 | * 12/1986 | Fuhr et al. | 427/212 |
| 5,182,318 | 1/1993 | Savin . | |
| 5,196,267 | * 3/1993 | Barder et al. | 427/215 |
| 5,232,775 | 8/1993 | Chamberlain et al. . | |
| 5,501,871 | * 3/1996 | Henderson | 427/212 |
| 5,614,255 | * 3/1997 | Kimura et al. | 427/212 |
| 5,667,726 | 9/1997 | Miyazaki et al. . | |
| 5,670,209 | * 9/1997 | Wyckoff | 427/215 |
| 5,674,624 | * 10/1997 | Miyazaki et al. | 428/122 |

FOREIGN PATENT DOCUMENTS

| | | |
|---|---|---|
| 0 482 821 | 4/1992 | (EP) . |
| 41 34 839 | 4/1992 | (DE) . |
| 0 573 706 | 12/1993 | (EP) . |

* cited by examiner

Primary Examiner—Shrive Beck
Assistant Examiner—Paul D. Strain
(74) Attorney, Agent, or Firm—Fisher, Christen & Sabol

(57) ABSTRACT

A process for the coating of glass microspheres with an aluminium hydroxide, which involves the hydrothermal treatment of a suspension of complexed $Al^{3+}$-ions with glass microspheres. The aluminium hydroxide coated glass microspheres can be applied in the production of light weight glass-reinforced plastic materials, e.g., for use in mass transportation.

19 Claims, 1 Drawing Sheet

PRODUCTION OF ALUMINIUM HYDROXIDE COATED GLASS MICROSPHERES

BACKGROUND OF THE INVENTION

1. Field of the Invention

The present invention provides a method for the coating of glass microspheres with an aluminium hydroxide.

2. Background Art

Applications for aluminium hydroxide coated glass microspheres are for example in the production of light weight glass-reinforced plastic composite materials for use in mass transportation.

Aluminium hydroxide is well-established in the plastics industry as a halogen-free filler which is used to impart fire retardant and smoke suppressing properties to synthetic thermosetting resin systems. Moreover, the trend towards stricter requirements on the burning behavior of plastics means an increasing demand for aluminium hydroxides which can be incorporated in plastics at ever higher filling levels. In glass-reinforced unsaturated polyester composites for example it is not uncommon for the aluminium hydroxide content of the composite material to be >50 wt. %.

In mass transportation for instance, it is possible to achieve the strict fire requirements on composite materials by using aluminium hydroxide alone as fire retardant filler. At the same time, however, the long term trend in composite materials is towards lighter weight composites which reduce energy costs. In the railways, for example, less weight means an increased pay-load for high speed trains and less wear and tear on the tracks.

Aluminium hydroxide ($Al(OH)_3$) has a density of 2.42 $g/cm^3$ which is considerably higher than the ca 1.1 $g/cm^3$ of a synthetic resin. The use of aluminium hydroxide by itself therefore raises the density and hence overall weight of the end-composite. In addition, the glass fibres used for structural composites contribute further to increased weight due to the even higher density of ca 2.6 $g/cm^3$.

Well-established in the art is the incorporation of hollow microspheres of aluminium silicate or borosilicate glass to decrease the overall weight of plastic composite materials and enhance their thermal insulation characteristics. Such microspheres are available in particle sizes which are similar to those of aluminium hydroxide but they have densities in the range of 0.1–1.0 $g/cm^3$, so that their incorporation in even relatively small amounts can provide a significant reduction in weight of the end composite. The problem when using hollow glass microspheres however is the need to maintain acceptable mechanical properties of the end composite. This is particularly important for structural plastic composite materials. However, the well-rounded, smooth surfaces of the hollow glass microspheres militate against an effective "bond" between the inorganic filler and the organic resin so that the use of hollow of glass microspheres is generally accompanied by a deterioration in physical properties of the composite material.

BROAD DESCRIPTION OF THE INVENTION

An objective of the present invention therefore is to avoid the problems associated with the methods known in the art and to develop a method for applying an aluminum hydroxide directly onto the surface of hollow glass microspheres.

The objective of the invention is achieved with the process according to the invention, comprising the steps of a) adding an organic complexing agent to an aqueous solution of an acidic aluminium salt b) raising the pH of the solution to a value of $\leq 9$, c) adding a predetermined amount of said glass microspheres to said solution to form a suspension d) hydrothermally treating said suspension in an oxidizing atmosphere at about 150° C. to 350° C. and e) separating the aluminium hydroxide coated glass microspheres from the suspension.

It has been surprisingly discovered that a glass microsphere coated following the process of the invention provides uniform aluminium hydroxide coating which remains firmly attached to the underlying glass microsphere surface during further processing thereby allowing the incorporation into synthetic resin of aluminium hydroxide coated glass microspheres with their associated fire retardant properties and providing a substrate for using conventional additives which increase compatibility and strengthen the "bond" between the inorganic and organic phases.

DETAILED DESCRIPTION OF THE INVENTION

Figure 1:
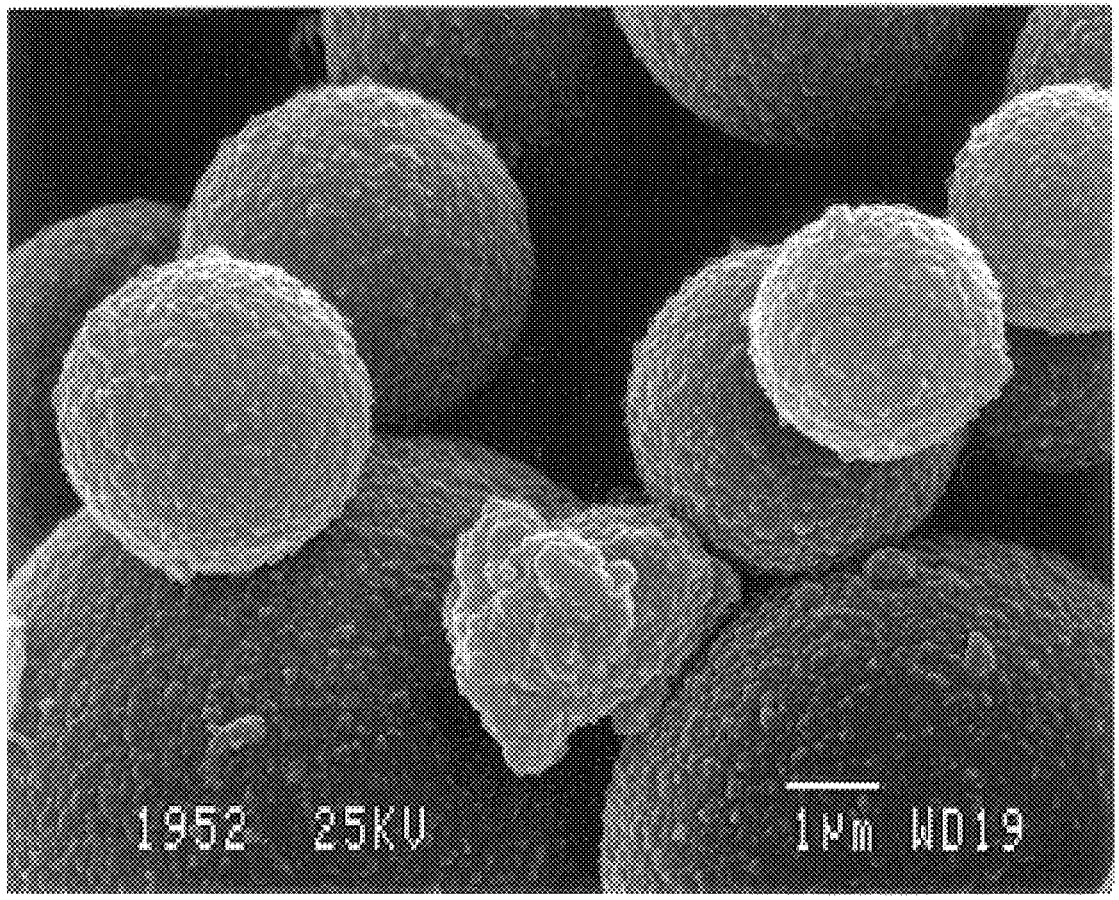
FIG. 1 shows a scanning electron micrograph of a typical appearance of the aluminium hydroxide coated glass microspheres.

Preferred aluminium hydroxide applied is the boehmite type aluminium hydroxide (AlOOH) which crystallizes out under the conditions used in the process of the present invention and firmly adheres on the substrate i.e. the glass microspheres.

Expediently, hollow microspheres of an aluminum silicate glass or a soda lime boro silicate glass are used. As preferred but non-limiting examples of hollow glass microspheres the FG-200-7 glass microspheres (aluminium silicate glass) of the Fillite Company and the K20 Scotchlite Glass Bubbles of the 3M Company (boro silicate glass) can be mentioned.

The preferred starting solution is an aqueous solution of an acidic aluminium salt, expediently selected from the group consisting of aluminium sulfate, aluminium nitrate and aluminum chloride in which the hydrated $Al^{3+}$-ions are according to step a) of the invention initially complexed and stabilized in solution by the addition of an organic complexing agent. Preferably organic acids, such as for example gluconic acid, tartaric acid, citric acid and oxalic acid are applied, usually before raising the pH of the solution into the alkaline range.

According to step b) of the invention the pH of the solution is then raised to a value of $\leq 9$, preferably to about 11 by addition of an inorganic base, preferably selected from the group consisting of sodium hydroxide, potassium hydroxide or of an aqueous solution of ammonia.

Subsequently according to step c) of the invention a pretermined amount of the glass microspheres is added to form a suspension. As a rule such an amount is added so that a concentration of 50 to 100 g/l is reached.

The hydrothermal treatment according to step d) of the invention, is then usually accomplished in an autoclave. Within this hydrothermal treatment, performed at temperatures of about 150° C. to 350° C., preferably at 250° C., the complex of the organic complexing agent with the hydrated $Al^{3+}$-ions oxidatively degrades. To support this oxidative degradation, oxygen or an oxygen containing gas is preferably added during the hydrothermal reaction.

As the $Al^{3+}$-complexes break down, the aluminium ions released crystallize out of solution in the form of boehmite at the same elevated temperature. The crystalline boehmite is deposited directly on the surfaces of the glass microspheres.

By varying the pH of the crystallizing solution, as a rule in the range of 10 to 12, the aluminium concentration, the nature of the complexing agent and/or the amount of oxygen used, influence can be exercised on the particle size of the boehmite and hence thickness of the coating.

While all four parameters can affect boehmite particle size, only the amount of oxygen is of major significance, i.e., when oxygen is used. At a predetermined pH, operating temperature and complexing agent, increasing the amount of oxygen used as a rule decreases the average size of the boehmite particle because of the faster initial release of aluminium ions for crystallization. Conversely, decreasing the amount of oxygen as a rule increases; the average size of the boehmite particles.

Separation of the aluminium hydroxide coated glass microspheres from the suspension according to step e) of the invention can be effected by methods known to those skilled in the art.

The coating can be varied in its thickness and adheres firmly to the underlying surface during subsequent handling and processing in synthetic resins. The aluminium hydroxide coating imparts fire retardant properties to the glass microspheres in addition to providing a substrate for effective bridge-building between the filler and the organic resin system.

The present invention will now be illustrated in detail with reference to the following examples, which however are not to be interpreted as limiting the scope of the invention.

EXAMPLE 1

A stock solution (21) of 0.45 M aluminium sulfate was prepared at room temperature by dissolving 600 g of $Al_2(SO_4)_3 \cdot 18H_2O$ in deionized water. To 500 ml of the stock solution in a 2 liter capacity glass beaker was added 500 ml of 1.5 M tartaric acid with agitation using a magnetic stirrer. Into the vortex created by the stirrer was run 10 M NaOH until the pH of the resulting solution reached 11.2. To a 1 liter aliquot of this solution was added 80 g of glass microspheres (FG-200-7 grade; Fillite) and the whole transferred to a 3 liter capacity Inconel autoclave fitted with an internal coil for rapid heating and cooling. The glass microspheres had a density of ca. 0.5 g/cm³ and ranged in particle size up to a maximum of ca. 150 $\mu$m.

Agitation of the autoclave contents was provided by a permanent magnetic stirrer fitted with a six-blade turbine and operated at 330 rpm. The autoclave was then closed and oxygen gas introduced at 25° C. to a partial pressure of $10 \times 10^5$ Pa. The autoclave and contents were heated to 250° C. and maintained at this temperature for 60 min.

On cooling back to conditions of atmospheric pressure and temperature, the suspension was removed from the autoclave and the solids filtered, washed with hot deionized water and dried at 110° C. The pH of the liquor filtrate was ca. 7.9 and was composed primarily of sodium sulfate (ca. 45 g/l sulfate) and the sodium salts of the organic carbon degradation products.

The dried product was boehmite coated glass microspheres and weighed 100.1 g. The density of the aluminium hydroxide composite hollow glass microspheres was 1.00 g/cm³. X-ray diffraction confirmed that the crystalline aluminium hydroxide coating was boehmite. The increase in average particle size indicated a boehmite layer thickness of ca 1 $\mu$m. Scanning electron microscope and EDAX analyses indicated that the boehmite is deposited uniformly over the microsphere surfaces.

The boehmite coating is highly polycrystalline in nature with the boehmite crystals intergrown and randomly oriented on the surfaces of the microsphere surfaces. The adherence of the boehmite to the underlying microsphere surfaces was strong enough to survive a heat treatment at 1000° C. for 60 min in which the boehmite was calcined to aluminium oxide of density ca. 3.95 g/cm³.

EXAMPLE 2

The experimental procedure of Example 1 was repeated with the difference that the system was seeded with borosilicate hollow glass microspheres (K20, scotchlite glass bubbles, 3M) which had a density of 0.20 g/cm³ and ranged in particle size up to a maximum of ca. 90 $\mu$m. The dried product was boehmite coated glass microspheres and weighed 100.2 g. The density of these aluminium hydroxide composite hollow glass microspheres was 0.76 g/cm³. Particle size analysis indicated that the thickness of the boehmite coating was of the order of 0.1–1.0 $\mu$m.

What is claimed is:

1. Process for the coating of glass microspheres with an aluminum hydroxide comprising the steps of
   a) adding an organic complexing agent to an aqueous solution of an acidic aluminium salt
   b) raising the pH of the solution to a value of $\leq 9$,
   c) after step b), adding an amount of said glass microspheres to said solution to form a suspension
   d) hydrothermally treating said suspension at about 150° C. to 350° C. and
   e) separating the aluminium hydroxide coated glass microspheres from the suspension.

2. Process according to claim 1 characterized in that the aluminum hydroxide applied is a boehmite-type aluminium hydroxide.

3. Process according to claim 2 characterized in that hollow microspheres of an aluminium silicate glass or a boro silicate glass are used.

4. Process according to claim 3 characterized in that the acidic aluminium salt is selected from the group consisting of aluminium sulfate, aluminium nitrate and aluminum chloride.

5. Process according to claim 4 characterized in that the organic complexing agent is an organic acid.

6. Process according to claim 5 characterized in that the organic acid is selected from the group consisting of gluconic acid, tartatric acid, citric acid and oxalic acid.

7. Process according to claim 6 characterized in that raising the pH in step b) is effected by adding to said solution an inorganic base.

8. Process according to claim 7 characterized in that the inorganic base is selected from the group consisting of sodium hydroxide, potassium hydroxide or of an aqueous solution of ammonia.

9. Process according to claim 7 characterized in that the glass microspheres are added in such an amount to said solution that a concentration of 50 to 100 g/l is reached.

10. Process according to claim 8 characterized in that the hydrothermal treatment in step d) is effected in the presence of oxygen or an oxygen containing gas.

11. Aluminium hydroxide coated glass microspheres which have been produced by the process of claim 1.

12. Process according to claim 1, wherein hollow microspheres of an aluminium silicate glass or a boro silicate glass are used.

13. Process according to claim 1, wherein the acidic aluminium salt is selected from the group consisting of aluminium sulfate, aluminium nitrate and aluminium chloride.

14. Process according to claim 1, wherein the organic complexing agent is an organic acid.

15. Process according to claim 14, wherein the organic acid is selected from the group consisting of gluconic acid, tartatric acid, citric acid and oxalic acid.

16. Process according to claim 1, wherein raising the pH in step (b) is effected by adding an inorganic base to said solution.

17. Process according to claim 16, wherein the inorganic base is selected from the group consisting of sodium hydroxide, potassium hydroxide and an aqueous solution of ammonia.

18. Process according to claim 1, wherein the glass microspheres are added in such an amount to said solution that a concentration of 50 to 100 g/l is reached.

19. Process according to claim 1, wherein the hydrothermal treatment in step (d) is effected in the presence of oxygen or an oxygen containing gas.

* * * * *